(12) United States Patent
dos Santos Silva et al.

(10) Patent No.: US 11,023,156 B2
(45) Date of Patent: Jun. 1, 2021

(54) DYNAMIC API ALLOCATION BASED ON DATA-TAGGING

(71) Applicant: INTERNATIONAL BUSINESS MACHINES CORPORATION, Armonk, NY (US)

(72) Inventors: Bruno dos Santos Silva, Mckinney, TX (US); Shawn Snodgrass, Almere (NL); Mark J. Walborn, Sevierville, TN (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/446,715

(22) Filed: Jun. 20, 2019

(65) Prior Publication Data

US 2020/0401336 A1 Dec. 24, 2020

(51) Int. Cl.
*G06F 3/06* (2006.01)
*G06F 16/955* (2019.01)
(Continued)

(52) U.S. Cl.
CPC .......... *G06F 3/0647* (2013.01); *G06F 3/0607* (2013.01); *G06F 3/067* (2013.01);
(Continued)

(58) Field of Classification Search
CPC ...... G06F 3/0607; G06F 3/0647; G06F 3/067; G06F 9/541; G06F 16/9035; G06F 16/9566

See application file for complete search history.

(56) References Cited

U.S. PATENT DOCUMENTS 8,099,415 B2 * 1/2012 Luo ................ G06F 16/258
707/736
8,234,372 B2 7/2012 Knapp
(Continued)

OTHER PUBLICATIONS

Pluzhnik et al., "Use of Dynamical Systems Modeling to Hybrid Cloud Database", Int. J. Communications, Network and System Sciences, 2013, 6, 505-512, Published Online Dec. 2013 (http://www.scirp.org/journal/ijcns), Scientific Research, 8 pages.
(Continued)

*Primary Examiner* — Larry T MacKall
(74) *Attorney, Agent, or Firm* — Teddi E. Maranzano

(57) ABSTRACT

Dynamic API allocation based on data-tagging is provided. Data that is stored in a local system is parsed and normalized. One or more highly used fields is identified and tagged. A counter corresponding to each highly used field is incremented upon each reference. Upon exceeding a threshold, data is migrated to object storage. An index is created for each highly used field. A bi-directional pipeline is created between the local system and the cloud-based system. The data structure is created in object storage in the cloud-based system. Data is dynamically migrated through the pipeline from the local system to cloud-based object storage. Cloud-based system sends an API endpoint to local system. Future data accesses to local data are redirected to object storage using the API endpoint. Local system continues monitoring data utilization. Upon utilization dropping below a threshold, data accesses are redirected to local system, using the local pointer.

20 Claims, 7 Drawing Sheets

(51) Int. Cl.
*G06F 9/54* (2006.01)
*G06F 16/9035* (2019.01)

(52) U.S. Cl.
CPC .......... *G06F 9/541* (2013.01); *G06F 16/9035* (2019.01); *G06F 16/9566* (2019.01)

(56) References Cited

U.S. PATENT DOCUMENTS

| | | | |
|---|---|---|---|
| 8,914,441 B2 | 12/2014 | Quintuna | |
| 9,225,675 B2 | 12/2015 | Patiejunas | |
| 9,280,678 B2 | 3/2016 | Redberg | |
| 9,462,055 B1* | 10/2016 | Herrin | H04L 67/1095 |
| 9,706,587 B2 | 7/2017 | Qi | |
| 2004/0210445 A1* | 10/2004 | Veronese | G06F 8/10 |
| | | | 705/1.1 |
| 2005/0257010 A1* | 11/2005 | Jones | G06F 12/0813 |
| | | | 711/133 |
| 2008/0154886 A1* | 6/2008 | Podowski | G06F 16/3325 |
| 2013/0110778 A1* | 5/2013 | Taylor | G06F 11/1435 |
| | | | 707/624 |
| 2014/0006465 A1* | 1/2014 | Davis | G06F 16/183 |
| | | | 707/827 |
| 2014/0019415 A1* | 1/2014 | Barker | G06Q 10/0639 |
| | | | 707/643 |
| 2015/0304234 A1* | 10/2015 | Salle | G06F 7/00 |
| | | | 709/226 |
| 2016/0098405 A1* | 4/2016 | Gorbansky | G06F 16/24578 |
| | | | 707/749 |
| 2016/0170649 A1* | 6/2016 | Ramesh | G06F 3/0623 |
| | | | 711/165 |
| 2016/0179840 A1* | 6/2016 | Dani | G06F 16/1847 |
| | | | 707/824 |
| 2016/0321264 A1 | 11/2016 | Neagovici-Negoescu | |

OTHER PUBLICATIONS

Strauch et al., "Migrating Application Data to the Cloud using Cloud Data Patterns", In Proceedings of the 3rd International Conference on Cloud Computing and Services Science, (CLOSER-2013), pp. 36-46.

Zhu et al., "Querying Combined Cloud-Based and Relational Databases." 2011 International Conference on Cloud and Service Computing, IEEE, 2011, pp. 330-335.

Mell et al., "The NIST Definition of Cloud Computing", Recommendations of the National Institute of Standards and Technology, Special Publication 800-145, Sep. 2011, 7 pages.

* cited by examiner

DYNAMIC API ALLOCATION BASED ON DATA-TAGGING

BACKGROUND

The present invention generally relates to data storage, and more specifically, to dynamic API allocation based on data-tagging.

As systems evolve, access to system resources, such as data, may be migrated to an Application Programming Interface (API). However, retrieving data from a single stream can lead to performance degradation. Data can be made available as object storage that is dynamically available to the application.

SUMMARY

Embodiments of the present invention are directed to a computer-implemented method for dynamic API allocation based on data-tagging. The method provides that at a local system, data is received and stored in various storage architectures. The local system parses and normalizes the stored data. The local system identifies one or more fields in the data as highly used and creates an index for the one or more fields that are highly used. The local system dynamically migrates all the stored data having the one or more highly used fields from the local system to cloud-based object storage in response to a counter associated with the highly used field exceeding a threshold. The method further provides for creating a bi-directional pipeline from the local system to a cloud-based system and sending to the cloud-based system a data structure corresponding to the stored data along with a request for storage space. The local system receives from the cloud-based system a pointer that establishes addressing between the local system and an object storage location in the cloud-based system. The method further provides for migrating through the bi-directional pipeline the stored data from the local system to the object storage in the cloud-based system. The method further provides for saving the counter associated with the highly used field and setting the counter to zero, and replacing the pointer local system to the pointer from the cloud-based system, whereby requests for data are satisfied by data located by the pointer from the cloud-based system.

Embodiments of the present invention are directed to a system for dynamic API allocation based on data-tagging. arguments of a module in real-time. The system includes a memory having computer readable computer instructions, and a processor for executing the computer readable instructions, that when executed, cause the processor to perform the steps of received and storing data at a local system, whereby the data is stored in various architectures. The computer system further provides that the local system parses and normalizes the stored data. The local system identifies one or more fields in the data as highly used and creates an index for the one or more fields that are highly used. The local system dynamically migrates all the stored data having the one or more highly used fields from the local system to cloud-based object storage in response to a counter associated with the highly used field exceeding a threshold. The computer system further provides for creating a bi-directional pipeline from the local system to a cloud-based system and sending to the cloud-based system a data structure corresponding to the stored data along with a request for storage space. The local system receives from the cloud-based system a pointer that establishes addressing between the local system and an object storage location in the cloud-based system. The computer system further provides for migrating through the bi-directional pipeline the stored data from the local system to the object storage in the cloud-based system. The computer system further provides for saving the counter associated with the highly used field and setting the counter to zero, and replacing the pointer local system to the pointer from the cloud-based system, whereby requests for data are satisfied by data located by the pointer from the cloud-based system.

Embodiments of the invention are directed to a computer program product for dynamic API allocation based on data-tagging, the computer program product comprising a computer readable storage medium having program instructions embodied therewith. The computer readable storage medium is not a transitory signal per se. The program instructions are executable by a processor to cause the processor to receive and store at a local system, data in various architectures. The local system parses and normalizes the stored data. The local system identifies one or more fields in the data as highly used and creates an index for the one or more fields that are highly used. The local system dynamically migrates all the stored data having the one or more highly used fields from the local system to cloud-based object storage in response to a counter associated with the highly used field exceeding a threshold. The computer program product further provides for creating a bi-directional pipeline from the local system to a cloud-based system and sending to the cloud-based system a data structure corresponding to the stored data along with a request for storage space. The local system receives from the cloud-based system a pointer that establishes addressing between the local system and an object storage location in the cloud-based system. The computer program product further provides for migrating through the bi-directional pipeline the stored data from the local system to the object storage in the cloud-based system. The computer program product further provides for saving the counter associated with the highly used field and setting the counter to zero, and replacing the pointer local system to the pointer from the cloud-based system, whereby requests for data are satisfied by data located by the pointer from the cloud-based system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
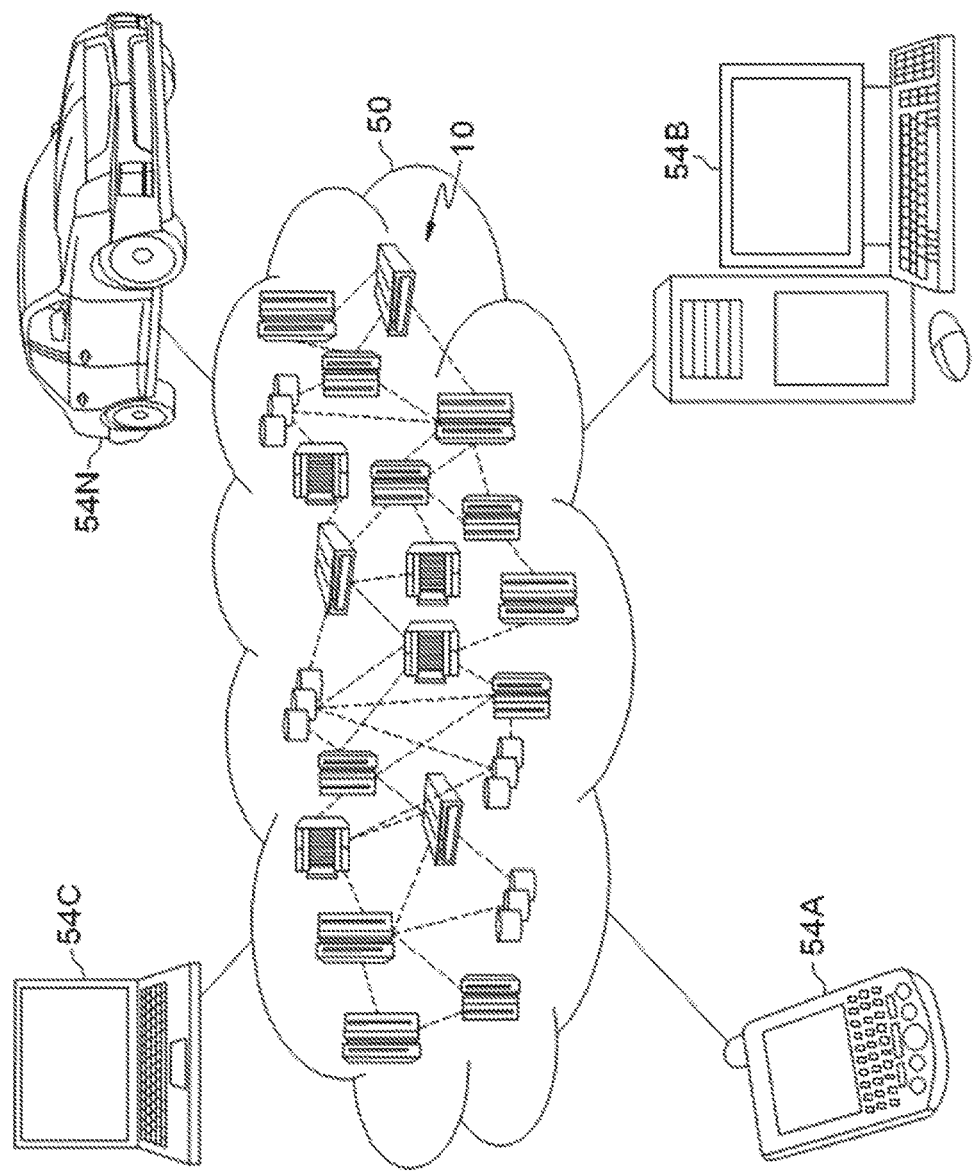
FIG. 1 depicts a cloud computing environment, according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. Similar reference numbers refer to substantially the same elements.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Figure 4:
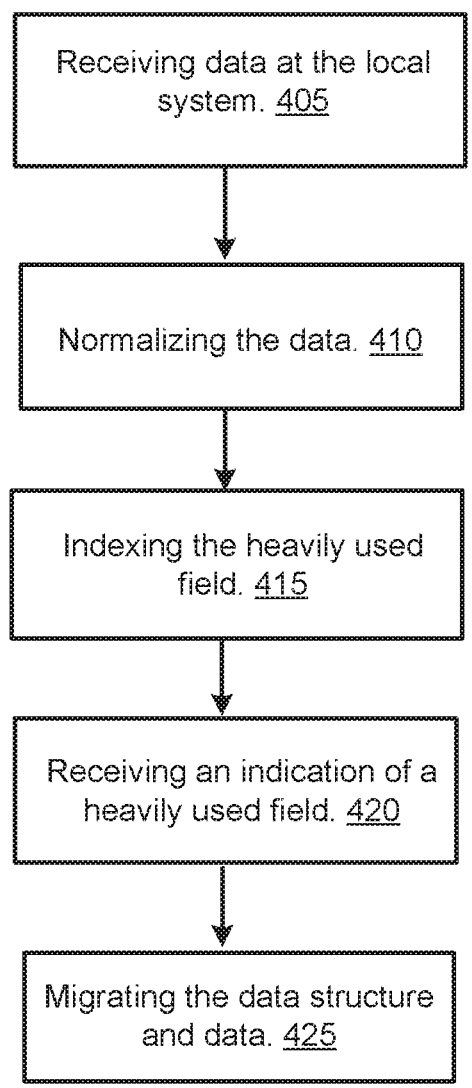
FIG. 4 depicts a flow diagram of a manual process for identifying highly utilized data.
Figure 5:
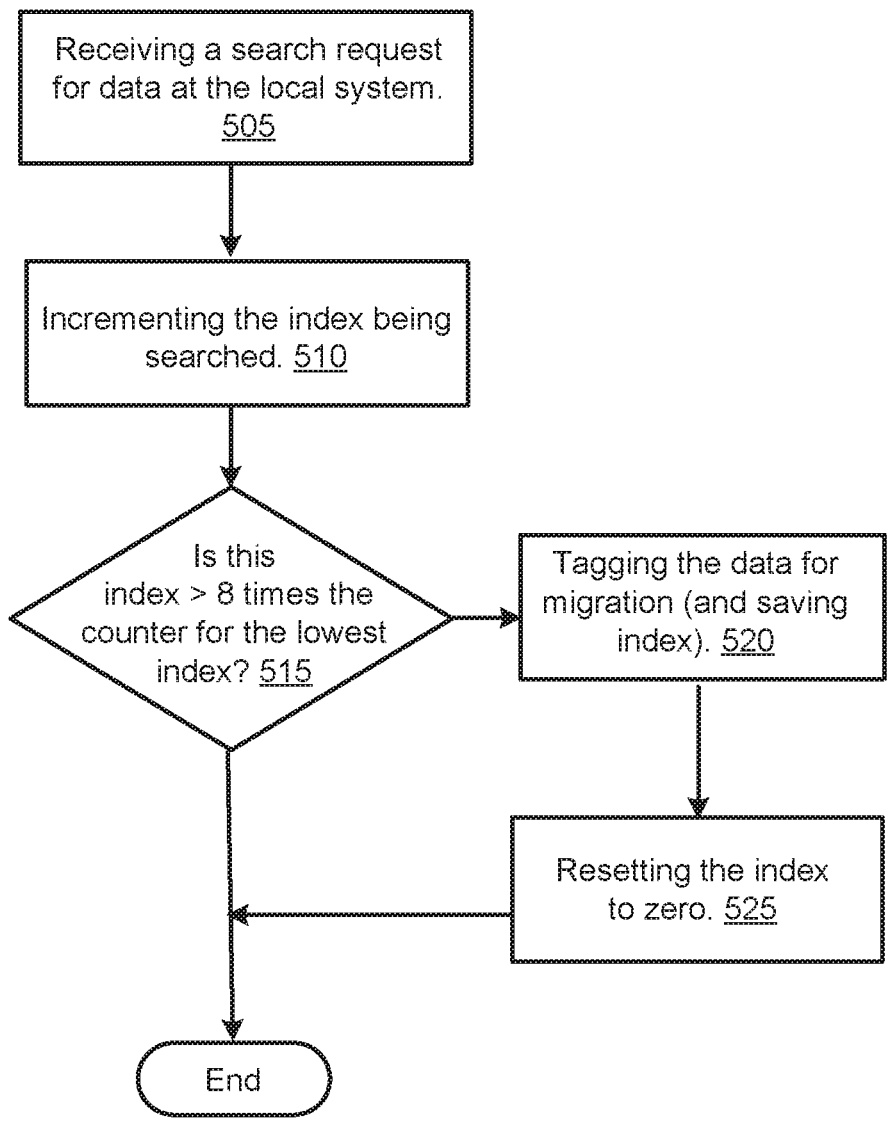
FIG. 5 depicts a flow diagram of an automated process for identifying highly utilized data.
Figure 6:
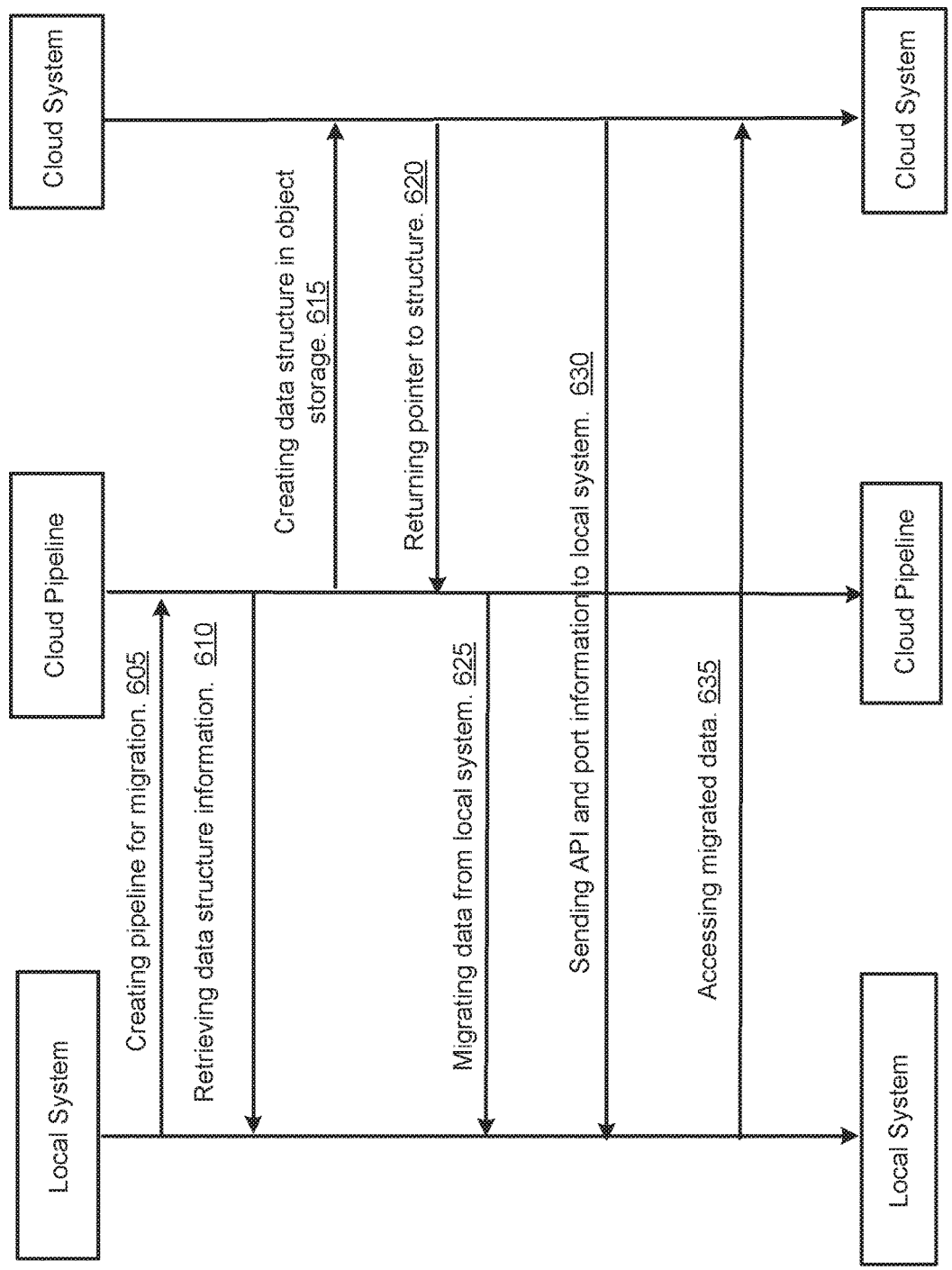
FIG. 6 depicts a flow diagram of data movement in the cloud-based system.

As will be shown in FIGS. 4-6, embodiments of the present invention tend to improve system performance and resource utilization by providing a framework for identifying highly utilized application data. This is done either manually, or automatically by the application at the local system. In this context, "local" refers to the storage location of the data, not the location of the server relative to the cloud-based system. Therefore, the data is referred to as "local" when it is stored on the server (i.e., local system) rather than on the cloud-based system object storage.

Highly utilization application data is dynamically migrated from the local system to object storage on a cloud-based system. Application queries for data that is in the process of migration are queued at the local system until the migration completes. The migrated data is replaced in the local system data storage by a pointer generated by the cloud-based system. Local requests for the migrated data are satisfied by following the pointer to the object storage, while local requests for data that is not highly utilized is still satisfied by the local system. The location of the data is transparent to the application, which does not need modification. The database system includes a pointer, for example "url:///data/text.txt", to where the data in a data structure is actually located. The local pointer in the local system is replaced with a cloud-based pointer, such as "url://cloud.com/text-bucket/txt". The local pointer in the local system is saved in the event that the data utilization falls below a pre-defined threshold. In that case, application data requests will be redirected to the local system. The storage and computing resources on the local system are conserved by offloading the highly utilized data, thereby improving overall local system performance, particularly I/O requests. As cloud-based systems are typically provisioned for reliability and performance under high volume workloads, the task of data management is also offloaded from the local system. This is possible, in part, because the cloud-based system can be configured to define and apply data retention policies to the migrated data, also providing that only highly utilized data occupies the object storage.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
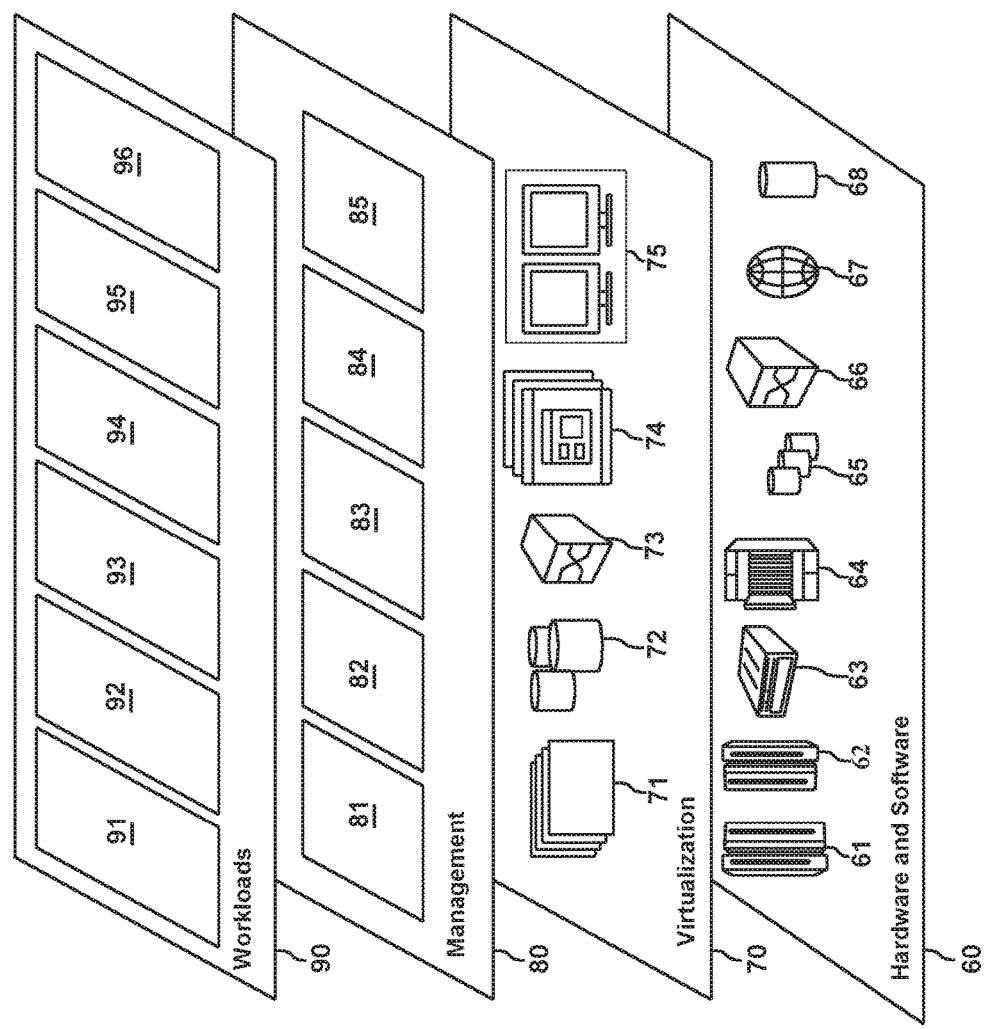
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; smart sampling processing 95; and recommendation processing 96.

Figure 3:
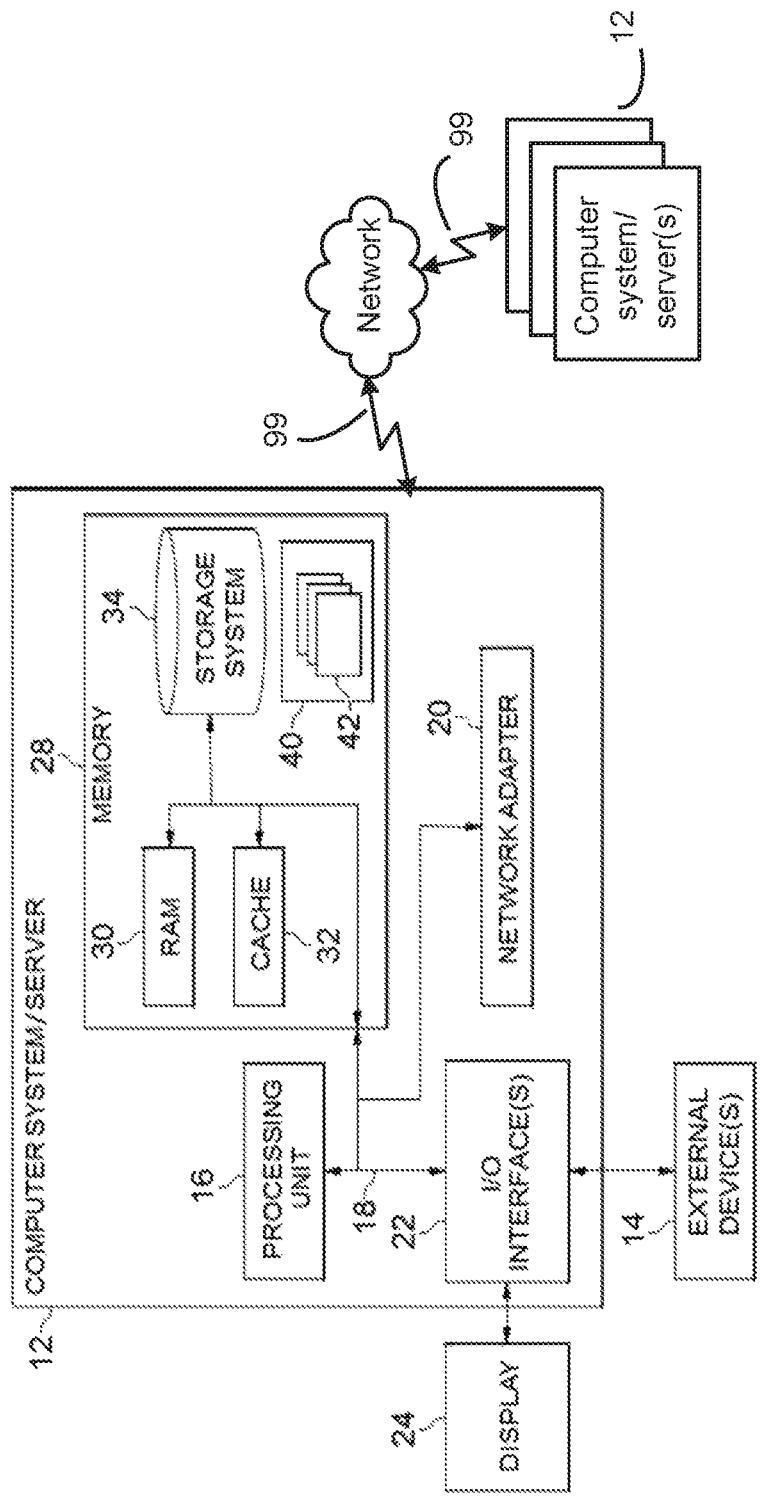
FIG. 3 depicts a high-level block diagram of an exemplary server, according to embodiments of the present invention.

FIG. 3 depicts an example block diagram of a host computer system/server 12 (server) which is in communication with one or more components. As shown, multiple servers 12 may be distributed over a wide geographic area and be in electronic communication with each other, and with the other components shown in FIG. 3, via the network 99.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 is configured to interact with a cloud-based system, for example, the cloud computing environment described with reference to FIG. 1. The server 12 can communicate securely with the cloud computing environment through a database direct tunnel, i.e., VPN. This configuration establishes a direct tunnel between the database on the server 12 and the cloud computing environment, by an exchange of security keys. The secure tunnel allows the exchanging of the database table structure and the database data directly from a database on the server 12 to an object storage in the cloud computing environment without requiring an Application Programming Interface (API) or interacting with the application front end. Accelerated cloud adoption because of simplified interaction with the cloud computing environment can result.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. Specialized program modules 42 can cooperate with the OS 40 to perform source code management functions, such as compiling, linking, and preparing the resulting module(s) for execution by the processing unit 16. Other specialized program modules can provide a transactional or database environment in which the application program modules execute. Still other specialized program modules 42 can cooperate with the OS 40 to tag data for migration to object storage.

The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the framework of FIGS. 4-6.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 3, the components of the server 12 may include, but are not limited to, one or more processors or processing units 16, a system memory 28, and a bus 18 that couples various system components, such as the system memory 28, to a processor unit 16.

System memory 28 can include computer system readable media in the form of volatile memory, such as random access memory (RAM) 30 and/or cache memory 32. The server 12 may further include other removable/non-removable, volatile/non-volatile computer system storage media. By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs, load modules, source code files, and system parameter files (e.g., the input parameters for the testing framework) may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

FIG. 4 depicts a flow diagram of a manual process for identifying highly utilized data.

In 405, the local system receives and stores a plurality of data. In this embodiment, the plurality of data is stored in one or more database systems. However, other storage architectures or combinations thereof, such as local object storage, an index file, and a linear in-memory file are also included. A pointer to the data is stored with the data on the local system. A cloud-based pointer to the cloud-based object storage can replace that local pointer, thereby dynamically redirecting access to data in either the local or cloud-based locations, depending on utilization of the highly used data. A plurality of applications that can be local or remote to the local system can access the data stored at the local system.

In 410, the administrator identifies a particular set of data as highly used. The identification can be made based on system and/or database performance statistics. Alternatively, the administrator can manually identify and pre-configure data as highly used based on input from the application's user. The system then normalizes the data. Normalizing is not limited to a particular method, but includes those methods that produce reduction of data to Canonical form. In this context, "normalizing" refers to parsing the data to learn the field names and the data within them. The field names can be capitalized, lower case, or abbreviated, yet still refer to the same field, because the data in the fields is the same in all cases. Querying the data using the database query language is one way to produce a report of the names of the fields and the data within them. Alternatively, the administrator can create a program in any script or compiled language to extract the names of the fields for analysis.

At 415, once the normalization is complete, the database at the local system creates an index based on input from the administrator. Each index represents a field name in the highly used data that an application is likely to use as a search field. The index is created using the language syntax supported by the particular database.

At 420, the local system receives an indication from the administrator that one or more index fields is highly used. The indication results from the administrator taking an action to identify the one or more index fields to the database. In the case of a graphical user interface, the administrator can check a box corresponding to the desired index field. In another case, the administrator executes language syntax, script, or other command, to define a tag for each index. In either case, the database responds by setting the indication in the database. How the database tracks and stores tagged fields is dependent upon the schema that the administrator designed and implemented. For example, the database schema may include one or more tables that store and track indexes and whether the index has an associated tag.

At 425, the local system migrates the structure (i.e., schema) to the cloud-based system through a pipeline service that the cloud-based system publishes. The cloud-based system creates the cloud-based object storage using the parameters the local system sent through the pipeline service. The parameters include the local structure and the request for the amount of object storage space to reserve for the data. The entire set of data is then migrated into the cloud-based object storage.

FIG. 5 is a flow diagram of an automated process for identifying highly used data. Where in FIG. 4, the local system identified and migrated highly used data based on manual administrator input, in FIG. 5, the local system automatically makes the identification and dynamically migrates the data. In both FIG. 4 and FIG. 5, the data structure is only migrated once. The entire set of data (i.e., table, file, etc.), and not just the highly used index fields, is migrated.

At 505, the local system receives a search request for data, for example, a query for data in a particular index field.

At 510, the local system increments a counter that is associated with the index being searched. Each index field is associated with a counter that is used to monitor references to the data. The counters are stored at the local system.

At 515, if the counter associated with the index being searched is not greater than eight times the lowest counter associated with an index, then processing ends until the next search request.

However, if at 515 the counter is greater than eight times the lowest counter, then at 520 the local system sets the indication in the database that this is a highly used field, and that the data should be migrated to cloud-based object storage. The counters are calculated and stored at the local system.

At 525, the counter associated with the index to be migrated is saved for continued monitoring, and the active counter is reset to zero. The local system continues to monitor and increment the reset counter. A data retention period policy for the cloud-based object storage defines that a counter falling below a user-defined threshold count over a user-defined period of time ages the data off cloud-based object storage. The usage tracking of the data continues after the data has been migrated, if the threshold lowers to less than fifty percent of the saved counter, when the retention period expires, application queries are redirected to the local data instead. This is done by replacing the pointer to the cloud-based object storage that is stored with the data in the local system with the local pointer that was saved during the migration. In this way, the cloud-based object storage is dynamically optimized for applications needing higher performance response times.

FIG. 6 is a flow diagram of data movement in the cloud-based system.

At 605, once the data to be migrated is identified, the local system creates a pipeline using the protocols provided by the cloud-based system. This establishes bi-directional communication between the local system and the cloud-based system.

At 610, the cloud pipeline retrieves the structure, for example the schema, that defines the organization of the data. The cloud pipeline communicates with the cloud-based system to allocate space for the data to be migrated and to create the data structure in the object storage at 615. At 620, the cloud-based system returns to the cloud pipeline a pointer to the cloud-based object storage. The cloud pipeline uses the pointer to establish addressing between the local system and the cloud-based object storage to migrate the data from the local system at 625. At 630, once the data is migrated to the cloud-based object storage, the cloud-based system creates an API endpoint which it sends to the local system. The API endpoint represents a hyperlink to the cloud-based object storage, and consists of a combined port and network address. As an example, "http://cloud.com:4434/api/storage-bucket-1/" represents an API address. However, this can vary dependent upon the particular cloud-based system deployment.

The local system receives the API endpoint from the cloud-based system and replaces the local pointer in the local system in the data where the data was previously accessed with the API endpoint. The local data remains stored in the local system. However, to reclaim the space, the local data may be deleted or backed up. At 635, future application requests for the migrated data are intercepted by the local system. When the local system accesses the local storage location, instead of finding the actual data, the local system finds the API endpoint. The local system retrieves the API endpoint. The local system sends the query to the object storage, using the API endpoint as the address. In this way, the data is migrated dynamically and transparently to the application. Additionally, modifications to the application are not needed.

Figure 7:
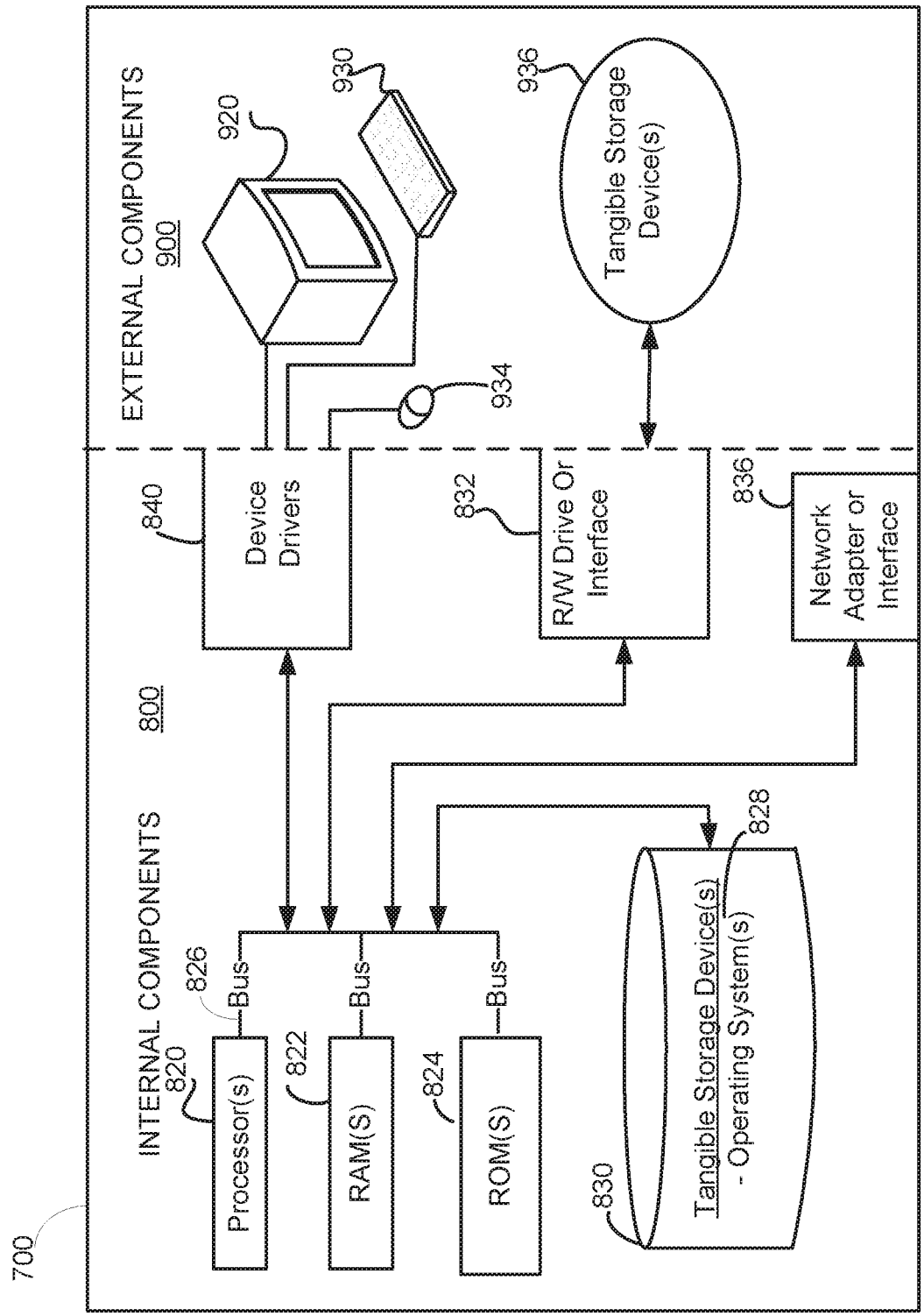
FIG. 7 depicts a block diagram of an embodiment of a computer system or cloud server in which the present invention may be implemented.

FIG. 7 is a block diagram of internal and external components of computers and servers depicted in FIG. 1 according to at least one embodiment.

It should be appreciated that FIG. 7 provides only an illustration of one implementation and does not imply any limitations regarding the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer system 12 may include respective sets of internal components 800 and external components 900 illustrated in FIG. 7. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs may be stored on one or more computer-readable tangible storage devices 830 for execution by one or more processors 820 via one or more RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The testing framework can be stored on one or more of the respective portable computer-readable tangible storage devices 936, read via the respective R/W drive or interface 832 and loaded into the respective hard drive 830.

Each set of internal components 800 may also include network adapters (or switch port cards) or interfaces 836 such as a TCP/IP adapter cards, wireless Wi-Fi interface cards, or wireless interface cards or other wired or wireless communication links. The software components of the testing framework can be downloaded from an external computer (e.g., server) via a network (for example, the Internet, a local area network or other, wide area network) and respective network adapters or interfaces 836. From the network adapters (or switch port adaptors) or interfaces 836, the software components of the testing framework are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by software or hardware-based systems that perform the specified functions or acts or carry out combinations of computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for dynamic API allocation based on data-tagging, comprising:
  at a local system:
   receiving and storing data in a plurality of storage architectures in the local system;
   parsing and normalizing the stored data;
   identifying one or more highly used fields in the data;
   creating an index for the one or more highly used fields; and
   migrating dynamically all the stored data having the one or more highly used fields from the local system to cloud-based object storage in response to a counter associated with one of the highly used fields exceeding a threshold.

2. The method of claim 1, wherein the migrating further comprises:
  creating a bi-directional pipeline from the local system to a cloud-based system;
  sending to the cloud-based system a data structure corresponding to the stored data along with a request for storage space;
  receiving from the cloud-based system a cloud-based pointer that establishes addressing between the local system and an object storage location in the cloud-based system;
  migrating through the bi-directional pipeline the stored data from the local system to the object storage in the cloud-based system;
  saving the counter associated with the highly used field and setting the counter to zero; and
  replacing the pointer in the local system with the pointer from the cloud-based system, wherein requests for the data are satisfied by data located by the pointer from the cloud-based system.

3. The method of claim 2, further comprising:
  monitoring, at the local system, utilization of highly used data that is migrated; and
  in response to the utilization of highly used data being below a user-defined threshold, redirecting dynamically requests for data from the cloud-based system to the local system, wherein the redirecting comprises replacing the cloud-based system pointer with the local system pointer.

4. The method of claim 1, wherein the storage architectures include: a database, an object storage, an index-file, an in-memory database, and a linear in-memory file.

5. The method of claim 1, wherein the identifying is in response to setting a tag that is associated with a highly used field in the stored data.

6. The method of claim 1, wherein a cloud-based pointer comprises a URL and a port address and wherein an application accesses the migrated data using the cloud-based pointer.

7. The method of claim 1, wherein whether a data request is satisfied from the local system or from the cloud-based object storage is transparent to an application.

8. The method of claim 1, wherein an application is unmodified to access migrated data.

9. A computer program product for dynamic API allocation based on data-tagging, comprising a computer-readable storage medium having computer-readable program code embodied therewith, the computer-readable program code when executed on a computer causes the computer to:
  at a local system:
   receive and store data in a plurality of storage architectures in the local system;
   parse and normalize the stored data;
   identify one or more highly used fields in the data;
   create an index for the one or more highly used fields; and
   migrate dynamically all the stored data having the one or more highly used fields from the local system to cloud-based object storage in response to a counter associated with one of the highly used fields exceeding a threshold.

10. The computer program product of claim 9, further comprising program code to:
  create a bi-directional pipeline from the local system to a cloud-based system;
  send to the cloud-based system a data structure corresponding to the stored data along with a request for storage space;
  receive from the cloud-based system a pointer that establishes addressing between the local system and an object storage location in the cloud-based system;
  migrate through the bi-directional pipeline the stored data from the local system to the object storage in the cloud-based system;

save the counter associated with the highly used field and setting the counter to zero; and replace the pointer from the local system to the pointer from the cloud-based system, wherein requests for data are satisfied by data located by the pointer from the cloud-based system.

11. The computer program product of claim 10, further comprising computer-readable program code to:

monitor, at the local system, utilization of highly used data that is migrated; and in response to the utilization of highly used data being below a user-defined threshold, redirect dynamically requests for data from the cloud-based system to the local system, wherein the redirect comprises replacing the cloud-based system pointer with the local system pointer.

12. The computer program product of claim 9, wherein the storage architectures include: a database, an object storage, an index-file, an in-memory database, and a linear in-memory file.

13. The computer program product of claim 9, wherein the identifying is in response to setting a tag that is associated with a highly used field in the stored data.

14. The computer program product of claim 9, wherein a cloud-based pointer comprises a URL and a port address and wherein an application accesses the migrated data using the cloud-based pointer.

15. The computer program product of claim 9, wherein whether a data request is satisfied from the local system or from the cloud-based object storage is transparent to an application.

16. The computer program product of claim 9, wherein an application is unmodified to access migrated data.

17. A computer system for dynamic API allocation based on data-tagging, the system comprising:

one or more processors;

a memory coupled to at least one of the processors;

a set of computer program instructions stored in the memory and executed by at least one of the processors in order to perform actions of:

at a local system:

receiving and storing data in a plurality of storage architectures in the local system;

parsing and normalizing the stored data;

identifying one or more fields in the data as highly used;

creating an index for the one or more highly used fields; and migrating dynamically all stored data having the one or more highly used fields from the local system to cloud-based object storage in response to a counter associated with the highly used field exceeding a threshold.

18. The computer system of claim 17, wherein the migrating further comprises:

creating a bi-directional pipeline from the local system to a cloud-based system;

sending to the cloud-based system a data structure corresponding to the stored data along with a request for storage space;

receiving from the cloud-based system a pointer that establishes addressing between the local system and an object storage location in the cloud-based system;

migrating through the bi-directional pipeline the stored data from the local system to the object storage in the cloud-based system;

saving the counter associated with the highly used field and setting the counter to zero; and replacing the pointer local system to the pointer from the cloud-based system, wherein requests for the data are satisfied by data located by the pointer from the cloud-based system.

19. The computer system of claim 18, further comprises program code to:

monitor, at the local system, utilization of highly used data that is migrated; and in response to the utilization of highly used data being below a user-defined threshold, redirecting dynamically requests for data from the cloud-based system to the local system, wherein the redirecting comprises replacing the cloud-based system pointer with the local system pointer.

20. The computer system of claim 17, wherein a location of the data is transparent to an application, and wherein an application is unmodified to access migrated data.

* * * * *